(12) United States Patent
Kharazi

(10) Patent No.: US 6,565,779 B1
(45) Date of Patent: May 20, 2003

(54) CABLE SEMICONDUCTING SHIELD COMPOSITIONS

(75) Inventor: Alex Kharazi, Somerset, NJ (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 549 days.

(21) Appl. No.: 09/052,429

(22) Filed: Mar. 31, 1998

(51) Int. Cl.$^7$ .............................................. B29C 47/00
(52) U.S. Cl. ...................... 264/37.1; 264/105; 264/140; 264/176.1
(58) Field of Search ................................ 264/37.1, 105, 264/140, 176.1, 294; 425/131.1, 113, 205; 366/69, 76.6

(56) References Cited

U.S. PATENT DOCUMENTS

| | | | | | |
|---|---|---|---|---|---|
| 4,197,381 A | * | 4/1980 | Alia | ............................ | 525/222 |
| 4,287,117 A | | 9/1981 | Theysohn et al. | ........ | 260/42.46 |
| 4,351,745 A | * | 9/1982 | Stinger | ........................ | 252/511 |
| 4,598,127 A | | 7/1986 | Kotani et al. | ................ | 525/229 |
| 5,369,149 A | * | 11/1994 | Unger | ........................ | 523/353 |
| 5,936,039 A | * | 8/1999 | Wang et al. | ................. | 525/178 |

FOREIGN PATENT DOCUMENTS

| | | |
|---|---|---|
| GB | 2278118 | 11/1994 |
| JP | 58176231 | 10/1983 |
| JP | 6131440 | 2/1986 |
| JP | 63318553 | 12/1988 |
| JP | 6420245 | 1/1989 |
| JP | 502288 | 1/1993 |
| JP | 5179009 | 7/1993 |
| JP | 8311208 | 11/1996 |
| KR | 938188 | 8/1993 |

OTHER PUBLICATIONS

Rubber Technology, 3rd ed., M. Morton, Ed., pp. 28–29, 1987.*
Basic Compounding & Processing of Rubber, H. Long, Ed., p. 52, 1985.*
Plastics Extrusion Technology, 2nd ed., A. Griff, pp. 318–319, 1968.*

* cited by examiner

*Primary Examiner*—Mark Eashoo

(57) ABSTRACT

A process for the preparation of a semiconducting shield composition comprising:

(i) introducing an elastomer into a melt/mixer having a melting zone and a mixing zone;

(ii) introducing particulate conductive carbon black into the melt/mixer in an amount of about 10 to about 25 percent by weight based on the weight of the resin;

(iii) melting the elastomer in the melting zone;

(iv) mixing the carbon black and the molten elastomer in the mixing zone;

(v) optionally, pelletizing the mixture of carbon black and elastomer;

(vi) recycling the mixture of carbon black and elastomer from step (iv) or the pellets from step (v) to a melt/mixer;

(vii) introducing additional particulate semiconductive carbon black into the melt/mixer in an amount sufficient to provide a total amount of carbon black in the range of about 25 to about 50 percent by weight based on the weight of the resin;

(viii) melting and mixing the mixture from step (vii); and (ix) pelletizing or extruding the mixture from step (viii).

7 Claims, No Drawings

CABLE SEMICONDUCTING SHIELD COMPOSITIONS

TECHNICAL FIELD

This invention relates to a process for the preparation of semiconducting compositions useful in the preparation of cable semiconducting shields.

BACKGROUND INFORMATION

A typical electric power cable generally comprises one or more conductors in a cable core that is surrounded by several layers of polymeric materials including a first semiconducting shield layer (conductor or strand shield), an insulating layer, a second semiconducting shield layer (insulation shield), a metallic tape or wire shield, and a protective jacket. Additional layers within this construction such as moisture impervious materials are often incorporated.

Polymeric semiconducting shields have been utilized in multilayered power cable construction for many decades. Generally, they are used to fabricate solid dielectric power cables rated for voltages greater than 1 kilo Volt (kV). These shields are used to provide layers of intermediate conductivity between the high potential conductor and the primary insulation, and between the primary insulation and the ground or neutral potential. The volume resistivity of these semiconducting materials is typically in the range of $10^{-1}$ to $10^8$ ohm-cm when measured on a completed power cable construction using the methods described in ICEA S-66-524, section 6.12, or IEC 60502-2 (1997), Annex. C. Typical shield compositions contain a polyolefin, such as ethylene/vinyl acetate copolymer with a high vinyl acetate content, conductive carbon black, an organic peroxide crosslinking agent, and other conventional additives such as a nitrile rubber, which functions as a strip force reduction aid, processing aids, and antioxidants. These compositions are usually prepared in granular or pellet form. Polyolefin formulations such as these are disclosed in U.S. Pat. No. 4,286,023 and European Patent Application 420 271. The shield composition is, typically, introduced into an extruder where it is co-extruded around an electrical conductor at a temperature lower than the decomposition temperature of the organic peroxide to form a cable. The cable is then exposed to higher temperatures at which the organic peroxide decomposes to provide free radicals, which crosslink the polymer.

The process of compounding resin formulations for wire and cable applications is a well documented and understood practice. A variety of techniques and/or equipment may be utilized in order to achieve the required product quality specifications. As product demands become more stringent, formulations are being developed to meet the diverse physical (dispersion, surface appearance), mechanical (tensile strength, brittleness), electrical (conductivity, resistivity), and chemical (melt index, melt temperature) property requirements. As these compounds are introduced, the ability of available compounding techniques to yield competitive products at a profitable margin becomes limited.

The products are unique in that they offer a variety of performance characteristics in one package. This is due to a high loading of various additives in the polymer matrix. Each of these additives performs a specific function to improve the characteristics of the final product. These additives also have their own physical limits, such as flowability, temperature sensitivity, and viscosity in the polymer matrix to name just a few. For this reason, as the level of additives in the polymer increases and becomes more diversified, several limitations are encountered. Physical and/or mechanical capabilities of the equipment limit the ability of the unit to produce acceptable quality material at substantial rates. This may be due to one of several reasons, such as inability of raw materials to feed at a higher loading level, instability of the raw materials at elevated temperatures, and/or excessive pressure. These system constraints force the user to reduce the production rate of the equipment in order to either meet the existing market demands or maintain the mechanical integrity of the equipment. As these demands become more stringent, either the efficiency of the equipment is further reduced, or the user is forced to make a substantial re-investment in new technology and/or additional facilities.

The introduction of carbon black to form semiconducting compositions is such a limitation. The additive is generally fed into the feed hopper of a melt/mixer or an extruder. Carbon black, however, is a low bulk density material, which tends to bridge or flood feed hoppers when introduced at typical loadings of, for example, 30 percent by weight at elevated feed rates, i.e., at rates above 2000 pounds per hour (pph) in a 200 millimeter Buss™ co-kneader or 1000 pph in a 140 millimeter Buss™ co-kneader. In addition to bridging or flooding, the high loading can lead to excessive temperatures, which tend to decompose some of the standard additives, and cause degradation of the product. The surge of the feed due to the bridging or flooding can lead to variations in composition viscosity, which, in turn, can lead to excessive power draw fluctuations on the mixer motor, temperature variations at the die plate, and pressure fluctuation upstream of the die pack. The surge also causes a quick build-up of particulates resulting in plugged screen packs and increased pressure, and eventually mixer shut down. Finally, it is found that when the semiconductive shield composition is extruded around a wire or core of wires, the coating is rough rather than smooth.

DISCLOSURE OF THE INVENTION

An object of this invention, therefore, is to provide a process for the preparation of semiconducting shield compositions, which permits the elastomers to be mixed with carbon black at elevated rates without the disadvantageous results outlined above. Other objects and advantages will become apparent hereinafter.

According to the invention, a process has been discovered for the preparation of a semiconducting shield composition comprising:

(i) introducing an elastomer into a melt/mixer having a melting zone and a mixing zone;

(ii) introducing particulate conductive carbon black into the melt/mixer in an amount of about 10 to about 25 percent by weight based on the weight of the resin;

(iii) melting the elastomer in the melting zone;

(iv) mixing the carbon black and the molten elastomer in the mixing zone;

(v) optionally, pelletizing the mixture of carbon black and elastomer;

(vi) recycling the mixture of carbon black and elastomer from step (iv) or the pellets from step (v) to a melt/mixer;

(vii) introducing additional particulate semiconductive carbon black into the melt/mixer in an amount sufficient to provide a total amount of carbon black in the range of about 25 to about 50 percent by weight based on the weight of the resin;

(viii) melting and mixing the mixture from step (vii); and
(ix) pelletizing or extruding the mixture from step (viii).

DESCRIPTION OF THE PREFERRED EMBODIMENT(S)

The resins most commonly used in semiconducting shields are elastomers of varying degrees of crystallinity from amorphous through low and medium crystallinity, preferably copolymers of ethylene and unsaturated esters having an ester content of at least about 10 percent by weight based on the weight of the copolymer. The term "elastomer" as used in this specification is considered to include mixtures of elastomers. The ester content is often as high as 80 percent by weight, and, at these levels, the primary monomer is the ester. The preferred range of ester content is about 30 to about 45 percent by weight. The percent by weight is based on the total weight of the copolymer. Examples of the unsaturated esters are vinyl esters and acrylic and methacrylic acid esters. The ethylene/unsaturated ester copolymers are usually made by conventional high pressure processes. These high pressure processes are typically run at pressures above 15,000 psi (pounds per square inch). The copolymers can have a density in the range of 0.900 to 0.990 gram per cubic centimeter, and preferably have a density in the range of 0.920 to 0.970 gram per cubic centimeter. The copolymers can also have a melt index in the range of about 10 to about 100 grams per 10 minutes, and preferably have a melt index in the range of about 20 to about 50 grams per 10 minutes. Melt index is determined under ASTM D-1238, Condition E. It is measured at 190° C. and 2160 grams.

The ester can have about 4 to about 20 carbon atoms, and preferably has about 4 to about 7 carbon atoms. Examples of vinyl esters are vinyl acetate, vinyl butyrate, vinyl pivalate, vinyl neononanoate, vinyl neodecanoate, and vinyl 2-ethylhexanoate. Vinyl acetate is preferred. Examples of acrylic and methacrylic acid esters are lauryl methacrylate; myristyl methacrylate; palmityl methaclylate; stearyl methacrylate; 3-methacryloxy-propyltrimethoxysilane; 3-methacryloxypropyltriethoxysilane; cyclohexyl methacrylate; n-hexylmethacrylate; isodecyl methacrylate; 2-methoxyethyl methacrylate; tetrahydrofurfuryl methacrylate; octyl methacrylate; 2-phenoxyethyl methacrylate; isobornyl methacrylate; isooctylmethacrylate; octyl methacrylate; isooctyl methacrylate; oleyl methacrylate; ethyl acrylate; methyl acrylate; t-butyl acrylate; n-butyl acrylate; and 2-ethylhexyl acrylate. Methyl acrylate, ethyl acrylate, and n- or t-butyl acrylate are preferred. In the case of alkyl acrylates and methacrylates, the alkyl group can have about 1 to about 8 carbon atoms, and preferably has about 1 to about 4 carbon atoms. As noted above, the alkyl group can be substituted with an oxyalkyltrialkoxysilane, for example. Other examples of elastomers are as follows:

IR (polyisoprene)
BR (polybutadiene)
SBR (polymer of butadiene copolymerized with styrene)
Nitrile (polymer of butadiene copolymerized with acrylonitrile; about 10 to about 50 percent by weight acrylonitrile). These elastomers are also referred to as nitrile rubbers.
Butyl (polymer of isobutylene copolymerized with isoprene)
EPM (polymer of ethylene copolymerized with propylene)
EPDM (polymer of ethylene copolymerized with propylene and a diene such as hexadiene, dicyclopentadiene, or ethylidene norbornene)
Copolymers of ethylene and a C3–C12 alpha-olefin
Terpolymers of ethylene, an alpha olefin (C3–C12), and a diene (preferably non-conjugated)
Neoprene (polychloroprene)
Silicone (polydimethyl siloxane)
Copolymers of ethylene and vinyltrimethoxy silane
Copolymers of ethylene and one or more of acrylonitrile or maleic acid esters
Copolymers of butadiene and isoprene
Polystyrene
Terpolymers of styrene, butadiene, and isoprene
Chlorobutyl (chlorinated copolymer of isobutylene and isoprene)
Bromobutyl (brominated copolymer of isobutylene and isoprene)
Brominated copolymer of isobutylene and paramethylstyrene The ethylene polymers useful in subject invention are preferably produced in the gas phase. They can also be produced in the liquid phase in solutions or slurries by conventional techniques. They can be produced by high pressure or low pressure processes. Low pressure processes are typically run at pressures below 1000 psi whereas, as noted above, high pressure processes are typically run at pressures above 15,000 psi. Typical low pressure catalyst systems, which can be used to prepare these polymers are magnesium/titanium based catalyst systems, which can be exemplified by the catalyst system described in U.S. Pat. No. 4,302,565; vanadium based catalyst systems such as those described in U.S. Pat. Nos. 4,508,842 and 5,332,793; 5,342,907; and 5,410,003; a chromium based catalyst system such as that described in U.S. Pat. No. 4,101,445; a metallocene catalyst system such as that described in U.S. Pat. Nos. 4,937,299 and 5,317,036; or other transition metal catalyst systems. Many of these catalyst systems are often referred to as Ziegler-Natta catalyst systems. Catalyst systems, which use chromium or molybdenum oxides on silica-alumina supports, are also useful. Typical processes for preparing the polymers are also described in the aforementioned patents. Typical in situ polymer blends and processes and catalyst systems for providing same are described in U.S. Pat. Nos. 5,371,145 and 5,405,901. A conventional high pressure process is described in Introduction to Polymer Chemistry, Stille, Wiley and Sons, New York, 1962, pages 149 to 151. In the high pressure processes, organic peroxides can be used as catalysts and the processes can be carried out in stirred autoclaves or tubular reactors. The elastomers other than the ethylene polymers are also prepared by conventional processes.

Conventional additives, which can be introduced into the composition, are exemplified by antioxidants, organic peroxides, coupling agents, ultraviolet absorbers or stabilizers, antistatic agents, pigments, dyes, nucleating agents, reinforcing fillers or polymer additives, slip agents, plasticizers, processing aids, lubricants, viscosity control agents, tackifiers, anti-blocking agents, surfactants, extender oils, metal deactivators, voltage stabilizers, flame retardant fillers and additives, crosslinking agents, boosters, and catalysts, and smoke suppressants. Additives and fillers can be added in amounts ranging from less than about 0.1 to more than about 50 percent by weight based on the weight of the composition.

In order to provide a semiconducting shield it is necessary to incorporate conductive particles into the composition. These conductive particles are generally provided by particulate carbon black, which is referred to above. Useful carbon blacks can have a surface area of about 50 to about 1000 square meters per gram. The surface area is determined under ASTM D 4820-93a (Multipoint B.E.T. Nitrogen Adsorption). Examples of conductive carbon blacks are the grades described by ASTM N550, N472, N351, N110, and acetylene black.

Examples of antioxidants are: hindered phenols such as tetrakis [methylene(3,5-di-tert-butyl-4-hydroxyhydrocinnamate)]methane, bis [(beta-(3,5-ditert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy) hydrocinnamate; phosphites and phosphonites such as tris(2, 4-di-tert-butylphenyl)phosphite and di-tert-butylphenyl-phosphonite; thio compounds such as dilaurylthiodipropionate, dimyristylthiodipropionate, and distearylthiodipropionate; various siloxanes; and various amines such as polymerized 2,2,4-trimethyl-1,2-dihydroquinoline, 4,4'-bis(alpha,alpha-demthylbenzyl) diphenylamine, and alkylated diphenylamines. Antioxidants can be used in amounts of about 0.1 to about 5 percent by weight based on the weight of the composition.

Compounding can be effected in a conventional melt/mixer or in a conventional extruder, and these terms are used in this specification interchangeably. Generally, the conductive shield composition is prepared in a melt/mixer and then pelletized using a pelletizer attachment or an extruder adapted for pelletizing. Both the melt/mixer, as the name implies, and the extruder, in effect, have melting and mixing zones although the various sections of each are known to those skilled in the art by different names. The semiconducting shield composition of the invention can be prepared in various types of melt/mixers and extruders such as a Brabender™ mixer, Banbury™ mixer, a roll mill, a Buss™ co-kneader, a biaxial screw kneading extruder, and single or twin screw extruders. A description of a conventional extruder can be found in U.S. Pat. No. 4,857,600. In addition to melt/mixing, the extruder can coat a wire or a core of wires. An example of co-extrusion and an extruder therefor can be found in U.S. Pat. No. 5,575,965. A typical extruder has a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1. In wire coating, where the material is crosslinked after extrusion, the die of the crosshead feeds directly into a heating zone, and this zone can be maintained at a temperature in the range of about 130° C. to about 260° C., and preferably in the range of about 170° C. to about 220° C.

In order to obtain the advantages of the invention, which can be referred to as a "two pass" process; the feed rates in the process of the invention are generally at least about 2000 pph since at lower rates the "single pass" process is usually adequate. Preferably, the rate is in the range of about 3000 to about 10,000 pph.

The amount of carbon black introduced in step(ii) can be in the range of about 10 to about 25 percent by weight based on the weight of the elastomer. It is preferably in the range of about 10 to about 20 percent by weight. It will be understood that other additives can be pre-mixed with the elastomer or added in steps (ii) and/or (vii). The usual additives are organic peroxides and antioxidants.

The temperature in the melting zone is, of course, at least as high as the melting point of the elastomer. It is generally in the range of about 150 to about 260 degrees C., and is maintained throughout the melt/mixer. Mixing speeds can be in the range of about 150 to about 500 revolutions per minute (rpm), and are preferably in the range of about 160 to about 300 rpm. As noted, the mixture of elastomer and carbon black can be recycled to the same melt/mixer, but is preferably recycled to another melt/mixer. The recycled mixture can be in the molten state, but is preferably pelletized [step (v)] before recycling.

In step (vii), the remaining carbon black is introduced in an amount generally in the range of about 15 to about 25 percent by weight based on the weight of the elastomer, and preferably in the range of about 20 to about 25 percent by weight in order to provide a total weight of carbon black in the range of about 25 to about 50 percent by weight, and preferably about 30 to about 45 percent by weight. In step (viii), the melting and mixing is continued at about the same rate and temperature as it is throughout the process. In step (ix), the mixture is either pelletized or the extrusion process is carried out in a conventional manner coating a wire or wire core.

Typical semiconducting shield compositions can be constituted as follows (by weight):

elastomer: about 55 to about 75 percent carbon black: about 25 to about 45 percent organic peroxide: about 0.5 to about 3 percent antioxidants: about 0.5 to about 3 percent The advantages of the invention lie in the capability of introducing carbon black at elevated rates without the adverse processing effects mentioned above; the smoothness of the coating after extrusion of the semiconducting shield composition around a wire or core; pellet uniformity; finer screens can be used due to lower pressure; uniform dispersion of conductive carbon black provides improved electrical performance; and reduced scorch because of lower temperatures.

The term "surrounded" as it applies to a substrate being surrounded by an insulating composition, jacketing material, or other cable layer is considered to include extruding around the substrate; coating the substrate; or wrapping around the substrate as is well known by those skilled in the art. The substrate can include, for example, a core including a conductor or a bundle of conductors, or various underlying cable layers as noted above.

All molecular weights mentioned in this specification are weight average molecular weights unless otherwise designated.

The patents mentioned in this specification are incorporated by reference herein.

The invention is illustrated by the following examples.

EXAMPLE

Two runs are made on a BUSS™ pilot scale co-kneader as a means of comparison. The machine is comprised of a 140 millimeter diameter screw (length-to-diameter ratio of 11:1) which rotates and oscillates while running. The screw is enclosed by a split barrel with several pins or teeth that extend out of the barrel and intermesh with the screw. The rotary and oscillatory motion of the screw, combined with its geometry and the location of the pins and teeth, allows the process to operate at relatively low shear rates. A 200 horsepower variable speed drive provides the power necessary for melting and mixing of the raw materials. Two feed hoppers are provided for metering of the raw materials, allowing flexibility in terms of splitting the feed streams. The hoppers may be equipped with an ELS port, in which a motor-driven auger helps to feed low bulk density powders to the screw. A vent port is also provided at the downstream end of the barrel if devolatilization of the compound is necessary. Upon exit from the screw and barrel, the compound is then pressurized with a Luwa Extrex™ gear pump and screened through a Keyenborg™ screen changer. Finally the product is pelletized through a Gala™ underwater pelletizing system. The first run involves a typical single pass run in which the full formulation is added to the melt/mixer. The second run involves a two pass run wherein, in a first pass, a partial formulation is fed to the melt/mixer, passed through a gear pump, and then pelletized through a die. These pellets are fed back into the BUSS™ co-kneader with the balance of the formulation for a second pass to bring the final pelletized material to full formulation. Results of the two runs are compared in the Table.

In addition to the variables reported in the Table, some other improvements in process performance are achieved as a result of the process carried out in the second run, which is an embodiment of the invention. These improvements include:

1. Increased operational stability, as measured by the mixer motor power draw. Rather than surging, as is typical in a one pass process, the power draw curve shows a much flatter and consistent demand throughout production. This enables an increase in the rate to three times, to 2100 pounds per hour in the second pass, before the maximum rate is achieved based on power availability.
2. Improved product dispersion. Even at higher rates, fewer large lumps and pimples (indicative of undispersed carbon black) can be seen on the extrusion tape.

TABLE

|  | First Run (single pass) | Second Run (first pass) | Second Run (second pass) |
|---|---|---|---|
| Standard rate in pounds per hour | 700 | 700 | 1400 |
| Polymer melt temperature in degrees C | 232.9 | 238.4 | 231 |
| Pressure increase in pounds per square inch-indicative of carbon black dispersion | essentially none | essentially none | essentially none |

Notes to Table:
1. Standard rate reflects normal conditions that will reliably obtain acceptable product quality and mechanical stability.
2. Polymer melt temperature is measured at the die plate.
3. Pressure increase is measured across the screen pack.

In order to maximize effectiveness with respect to rate improvement, the two pass technique is preferably carried out in two melt/mixers that are either separate from one another or set up in a cascade arrangement. Operating with two melt mixers, the first pass is preferably carried out on a melt/mixer with a less complex configuration. This allows for high throughput rates with less stringent product quality standards. Product from the first melt/mixer is then fed to a second melt mixer with more sophisticated capabilities. Such a melt/mixer provides the additional mixing that will optimize the properties of the finished product. The combined effect of such a process leads to substantial improvements in unit production rates. The second melt/mixer (and therefore increased capital expenditure) is not necessary if substantial improvements in product quality are the primary objective and only slight improvements in rate are acceptable. In this case, the recycling can take place in one melt/mixer.

What is claimed is:

1. A process for the preparation of a semiconducting shield composition comprising:
    (i) introducing an elastomer into a melt/mixer having a melting zone and a mixing zone;
    (ii) introducing particulate conductive carbon black into the melt/mixer in an amount of about 10 to about 25 percent by weight based on the weight of the resin;
    (iii) melting the elastomer in the melting zone;
    (iv) mixing the carbon black and the molten elastomer in the mixing zone;
    (v) optionally, pelletizing the mixture of carbon black and elastomer;
    (vi) recycling the mixture of carbon black and elastomer from step (iv) or the pellets from step (v) to a melt/mixer;
    (vii) introducing additional particulate semiconductive carbon black into the melt/mixer in an amount sufficient to provide a total amount of carbon black in the range of about 25 to about 50 percent by weight based on the weight of the resin;
    (viii) melting and mixing the mixture from step (vii); and
    (ix) pelletizing or extruding the mixture from step (viii).

2. The process defined in claim 1 wherein the elastomer is a copolymer of ethylene and an unsaturated ester selected from the group consisting of vinyl esters, acrylic acid esters, and methacrylic acid esters wherein the ester is present in the copolymer in an amount of about 10 to about 80 percent by weight.

3. The process defined in claim 1 wherein the melt/mixer in step (i) is a first melt/mixer and the melt/mixer in step (vi) is a second and independent melt/mixer having a melting zone and a mixing zone.

4. The process defined in claim 1 wherein, in step (ii), the amount of carbon black is in the range of about 10 to about 20 percent by weight, and, in step (vii), the total amount of carbon black is in the range of about 30 to about 45 percent by weight.

5. The process defined in claim 1 wherein the elastomer is a blend of a polyolefin and a butadiene/acrylonitrile copolymer containing about 10 to about 50 percent by weight acrylonitrile based on the weight of the copolymer.

6. The process defined in claim 1 wherein the mixture is pelletized in step (v).

7. A process for the preparation of a semiconducting shield composition comprising:
    (i) introducing an elastomer, i.e., a copolymer of ethylene and an unsaturated ester selected from the group consisting of vinyl esters, acrylic acid esters, and methacrylic acid esters wherein the ester is present in the copolymer in an amount of about 30 to about 45 percent by weight, into a first melt/mixer having a melting zone and a mixing zone;
    (ii) introducing particulate conductive carbon black into the melt/mixer in an amount of about 10 to about 20 percent by weight based on the weight of the resin;
    (iii) melting the elastomer in the melting zone;
    (iv) mixing the carbon black and the molten elastomer in the mixing zone;
    (v) pelletizing the mixture of carbon black and elastomer;

(vi) recycling the pellets from step (v) to a second and independent melt/mixer having a melting zone and a mixing zone;

(vii) introducing additional particulate semiconductive carbon black into the second melt/mixer in an amount sufficient to provide a total amount of carbon black in the range of about 30 to about 45 percent by weight based on the weight of the resin; and (viii) melting and mixing the mixture from step (vii); and (ix) pelletizing or extruding the mixture from step (viii).

* * * * *